United States Patent
Yamada

(10) Patent No.: US 6,807,907 B2
(45) Date of Patent: Oct. 26, 2004

(54) PRINTING SYSTEM FOR CARRYING OUT ENERGY CONSERVATION OPERATION

(75) Inventor: Hirokazu Yamada, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/097,274

(22) Filed: Mar. 15, 2002

(65) Prior Publication Data

US 2002/0134268 A1 Sep. 26, 2002

(30) Foreign Application Priority Data

Mar. 26, 2001 (JP) ........................................ 2001-087879

(51) Int. Cl.[7] .............................................. B41F 33/00
(52) U.S. Cl. ..................................... 101/484; 358/1.15
(58) Field of Search ................................ 101/484, 483; 358/1.13, 1.14, 1.15, 413, 1.9, 1.16, 1.17; 709/201, 202, 203, 204, 205, 206, 223, 224, 225, 226, 227, 228

(56) References Cited

U.S. PATENT DOCUMENTS

| | | | |
|---|---|---|---|
| 5,848,318 A | | 12/1998 | Okimoto |
| 5,937,148 A | * | 8/1999 | Okazawa .................. 358/1.13 |
| 6,237,106 B1 | * | 5/2001 | Koyama et al. ............ 713/502 |
| 6,268,925 B1 | | 7/2001 | Yamanaka |
| 6,452,692 B1 | * | 9/2002 | Yacoub .................... 358/1.15 |
| 6,734,985 B1 | * | 5/2004 | Ochiai .................... 358/1.15 |
| 2002/0054330 A1 | * | 5/2002 | Jinbo et al. .............. 358/1.15 |
| 2002/0075510 A1 | * | 6/2002 | Martinez .................. 358/1.15 |
| 2002/0126516 A1 | * | 9/2002 | Jeon ........................ 363/67 |
| 2002/0140963 A1 | * | 10/2002 | Otsuka .................... 358/1.14 |
| 2003/0090697 A1 | * | 5/2003 | Lester et al. ............. 358/1.14 |
| 2003/0160993 A1 | * | 8/2003 | Kang ....................... 358/1.15 |

FOREIGN PATENT DOCUMENTS

| | | |
|---|---|---|
| JP | 05-276094 | 10/1993 |
| JP | 06-223017 | 8/1994 |
| JP | 2000-165419 | 6/2000 |
| JP | 2000-187578 | 7/2000 |
| JP | 2001-075697 | 3/2001 |

* cited by examiner

Primary Examiner—Anjan Deb
Assistant Examiner—Hoai-An D. Nguyen
(74) Attorney, Agent, or Firm—Burns, Doane, Swecker & Mathis, L.L.P.

(57) ABSTRACT

A printer 100 sends status information, ID information and the like to a network device 200 before entering an energy conservation mode in which it is unable to communicate with external devices, so that the network device 200 will respond to a status information request on its behalf. Where a PC 300 requests status information from the printer 100, the network device 200 in which substitute response setting was put in effect responds with the printer 100 status information on behalf of the printer 100. By receiving the status response from the network device 200, the PC 300 can verify that the printer is connected to the network 400. The PC 300 can also send a release order that releases the printer 100 from the energy conservation state so that it can initiate printing.

23 Claims, 10 Drawing Sheets

PRINTING SYSTEM FOR CARRYING OUT ENERGY CONSERVATION OPERATION

This application is based on application No. 2001-87879 filed in Japan, the content of which is hereby incorporated by reference.

BACKGROUND OF THE INVENTION

1. Field of the Invention

This invention relates to a printer, data processor, printing system, printer control method, data processor processing method, program, data processing program and recording media in which the above programs are recorded, and more particularly to a printer, data processor, printing system, printer control method, data processor processing method, program, data processing program and recording media in which the above programs are recorded that carry out an energy-conservation operation.

2. Description of the Related Art

Some printers that are connected to a network such as a LAN enter an energy conservation mode during non-use, i.e., when print data is not received for a certain amount of time, in order to reduce power consumption.

The power supply to components that require a large amount of power, such as the heater and the drive unit for the printer, is stopped or reduced in such energy conservation mode.

FIG. 14 is a block diagram showing the construction of the power supply system of a printer 100, which is a type of conventional printer.

In the printer 100 shown in FIG. 14, during non-use, i.e., when print data is not received for a certain amount of time, the controller 102 sends a control signal 1 to the relay circuit 106. The relay circuit 106 turns OFF based on the control signal 1, and the power supply from the power supply unit 101 to the drive circuit 104 and the heater circuit 105 is terminated. Consequently, the printer 100 enters an energy conservation mode.

Where another device (such as a personal computer, for example) connected to the network performs printing via the printer 100, such device verifies the state of operation of the printer 100. To that end, the device requests the transmission of status information from the printer 100.

Even when the printer 100 is in the energy conservation mode, the controller 012 and the network controller 103 are receiving power supply. Therefore, the printer 100 can receive the request for status information sent from other devices. The printer 100 responds to the received request for status information. The status response indicates that the printer 100 is connected to the network and is available for use.

Where print data is received from another device when the printer 100 is in the energy conservation mode, the controller 102 sends a control signal 1 to the relay circuit 106. Based on the control signal 1, power is supplied to the drive circuit 104 and the heater circuit 105 via the relay circuit 106, and the printer 100 is released from the energy conservation mode.

Through this operation, energy conservation is realized when the printer 100 is not being use. In addition, when the user wishes to use the printer 100, power supply is quickly resumed. Consequently, a printer offering low power consumption but excellent convenience to the user is provided.

However, in recent years, further energy conservation has been demanded and stricter standards have been proposed. In order to meet these demands and standards, the termination or reduction of power supply to the controller 102 and the network controller 103 has also been sought during energy conservation mode.

However, if power supply to the controller 102 an d the network controller 103 is terminated, the printer 100 can no longer communicate with external devices. Consequently, it can no longer send its status response to other devices connected to the network. As a result, such other devices deem that the printer 100 to be offline from the network, giving rise to the problem that printing cannot be performed.

SUMMARY OF THE INVENTION

With the above situation as a backdrop, an object of the present invention is to provide a printer, data processor, printing system, printer control method, data processor processing method, program, data processing program and recording media in which the above programs are recorded that can achieve greater energy conservation than the conventional energy conservation mode but yet do not compromise user convenience.

In order to attain the above object, according to one aspect of the present invention, the printer includes a receiver that receives data from a first device over a network; a controller that alternates a state of the printer between a first state in which the printer is able to respond to data received by the receiver and a second state in which the printer is not able to respond to the data, and that outputs a substitute response request signal to a second device over the network so that the second device may respond to the data from the first device when the controller switches the state from the first state to the second state.

According to another aspect of the present invention, the data processing apparatus includes a receiver that receives from a printer over a network data that includes a substitute response request signal that orders a substitute response to a request for status information sent to the printer, printer identification information and printer status information; and a controller that, when the status information of the printer is requested by an external device, sends to the external device, based on the data, a response containing status information instead of the printer.

According to still another aspect of the present invention, the data processing apparatus includes a controller that, based on the status information received from the printer over a network, determines that the printer is in a state in which the printer is not able respond, and that outputs to the printer a release request signal that cancels the state and enables the printer to respond.

According to still another aspect of the present invention, the printing system comprising a printer and a data processing apparatus, wherein the printer including a receiver that receives data from an external device over a network; a controller that switches a state of the printer between a first state in which the printer is able to respond to the data received by the receiver and a second state in which the printer is not able to respond to the data, and that outputs a substitute response request signal to the data processing apparatus over the network so that the data processing apparatus may respond to the data when the controller switches the state from the first state to the second state; and wherein the data processor including a receiver that receives from the printer over the network data that includes a substitute response request signal, printer identification information and printer status information; and a controller that, when the status information of the printer is requested by the external device, sends to the external device, based on the data, a substitute response containing the printer status information instead of the printer.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Figure 1:
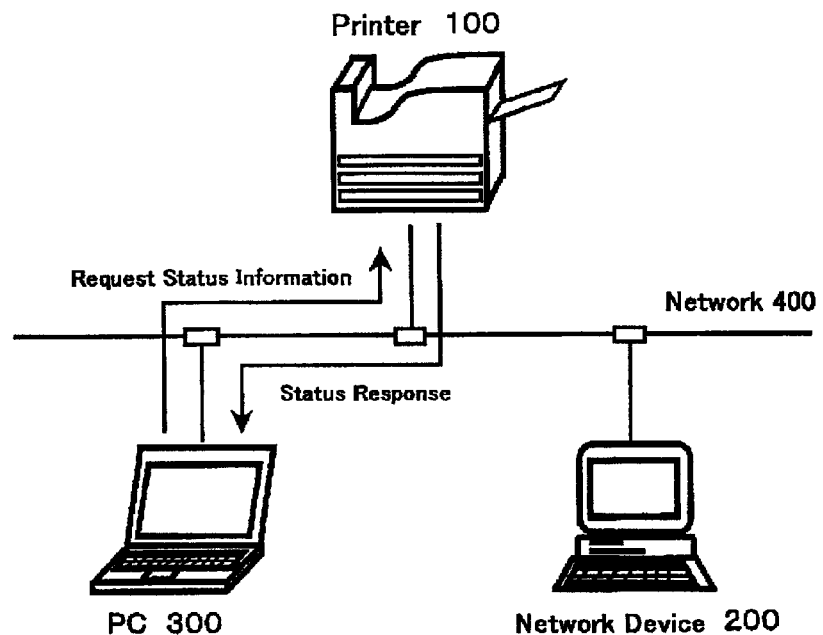
FIG. 1 is an illustration showing the construction of a network system using the network printer comprising one embodiment of the present invention.

FIG. 1 is an illustration showing the construction of a network system in which the network printer of one embodiment of the present invention is shown.

The network system shown in FIG. 1 includes a personal computer (hereinafter referred to as the 'PC') 300, a network printer (hereinafter referred to as the 'printer') 100 and a network device 200. They communicate with each other over a network 400. The network device 200 is a personal computer in this embodiment, but may comprise a printer server or the like instead.

Figure 2:
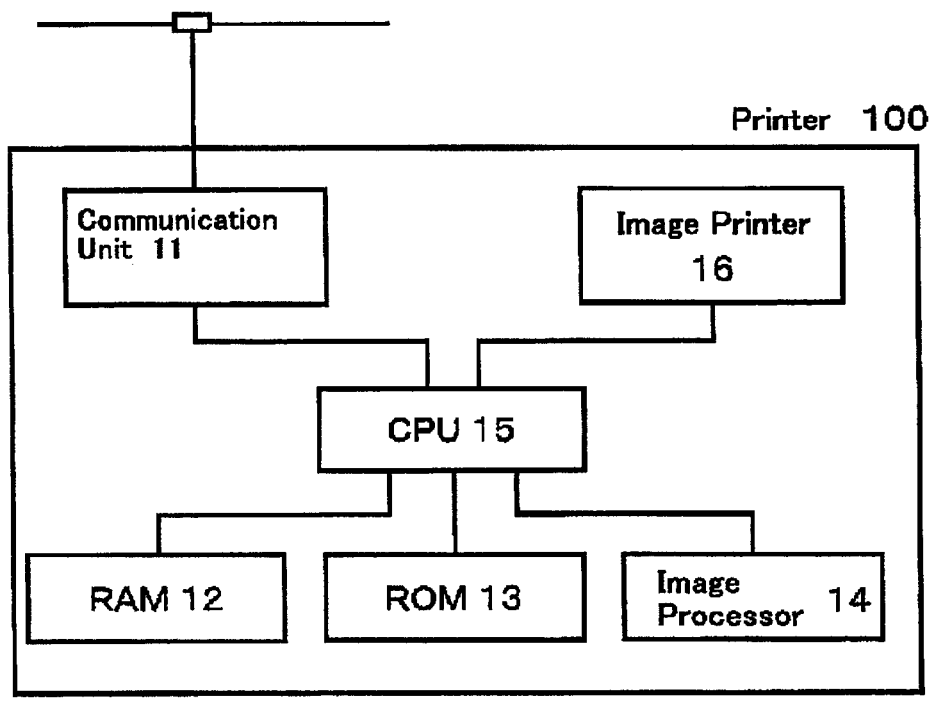
FIG. 2 is a block diagram showing the hardware construction of the printer 100 shown in FIG. 1.

FIG. 2 is a block diagram showing the hardware construction of the printer 100.

The printer 100 shown in FIG. 2 includes a communication unit 11 that sends and receives data to and from the PC 300 and the like over the network 400, a RAM 12 that stores received print data and the like, a ROM 13 that stores programs and the like, an image processor 14 that processes print data into image information, an image printer 16 that performs printing of the print data processed into image information, and a CPU 15 that carries out control of the printing process.

Figure 3:
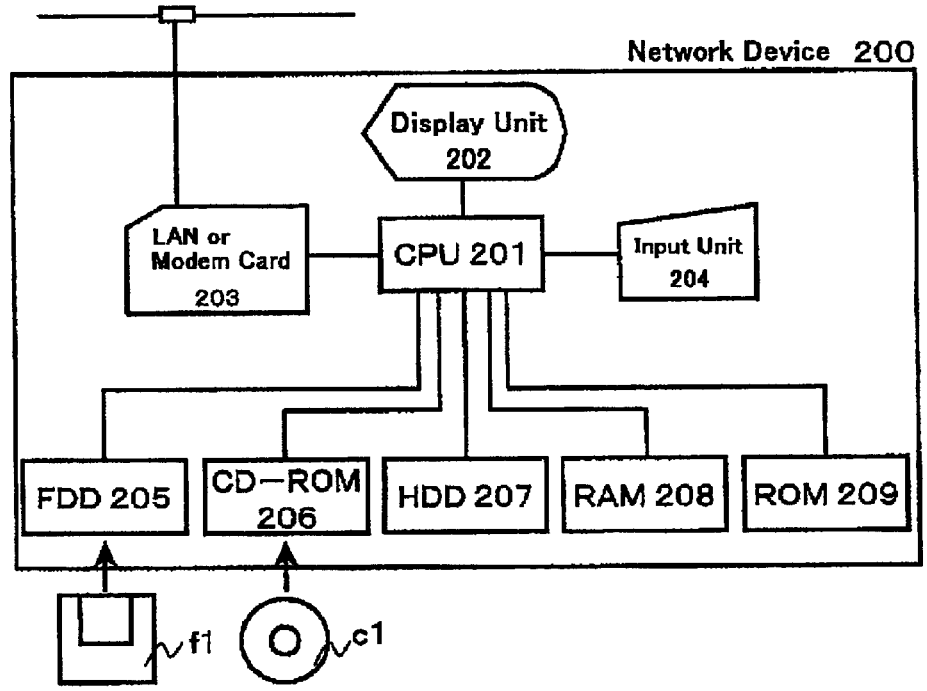
FIG. 3 is a block diagram showing the hardware construction of the network device 200 shown in FIG. 1.

FIG. 3 is a block diagram showing the hardware construction of the network device 200.

The network device 200 shown in FIG. 3 includes a CPU 201 that performs overall control of the device, a display unit 202 to display images and text data, a LAN or modem card 203 to connect to the network 400, an input unit 204 comprising a keyboard and a mouse or the like, a floppy disk drive 205, a CD-ROM drive 206, a hard disk drive 207, a RAM 208 and a ROM 209.

The network device 200 can read the data and programs recorded on a floppy disk f1 using the floppy disk drive 205, as well as the data and programs recorded on a CD-ROM c1 using the CD-ROM drive 206.

Figure 4:
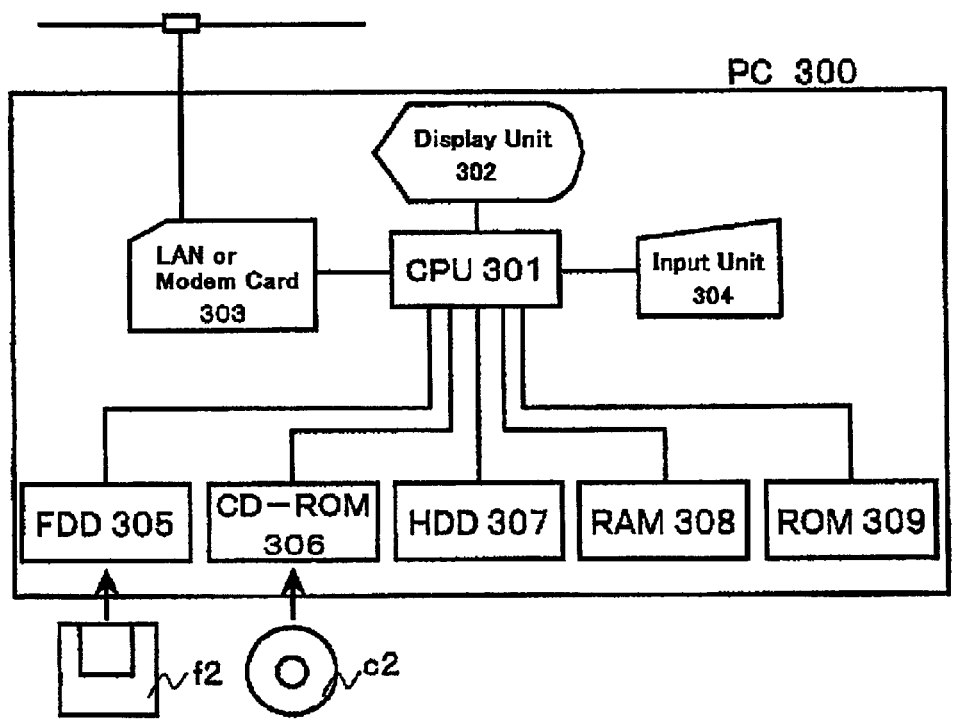
FIG. 4 is a block diagram showing the hardware construction of the PC 300 shown in FIG. 1.

FIG. 4 is a block diagram showing the hardware construction of the PC 300.

Similar to the network device 200, the PC 300 shown in FIG. 4 includes a CPU 301, a display unit 302, a LAN or modem card 303, an input unit 304, a floppy disk drive 305, a CD-ROM drive 306, a hard disk drive 307, a RAM 308 and a ROM 309.

The PC 300 can read the data and programs recorded on a floppy disk f2 using the floppy disk drive 305. It can also read the data and programs recorded on a CD-ROM c2 using the CD-ROM drive 306.

The program that causes the network device 200 and the PC 300 to execute processing and that is described below with reference to the flow charts may be provided as a program product recorded on the floppy disk f1 or f2 or the CD-ROM c1 or c2, and is installed in the hard disk and read to the RAM for execution. The program may also be provided recorded on the hard disk drive 207 or 307, in the ROM 209 or 309, or on a recording medium such as a memory card. The program that causes the printer 100 to carry out processing may be provided recorded in the ROM 13 or on a recording medium such as a memory card. A program product includes the program itself and the recording medium on which the program is recorded.

In the network system shown in FIG. 1, when performing printing using the printer 100, the PC 300 sends the printer 100 a request for status information in order to verify the connection and operation status thereof Where the printer 100 is normally connected to the network 400, the printer 100 responds to the status information request received from the PC 300.

The PC 300 decodes the status response received, and verifies the connection and operation status of the printer 100.

Where the PC 300 determines that the operation status of the printer 100 is such that the printer is available for printing, it sends the printer 100 print data for which printing should be carried out. The printer 100 that has received the print data carries out the printing routine regarding the print data.

When the printing is completed, the printer 100 enters a standby mode, and waits for the receipt of the next print data. If no print data is received for a certain amount of time and the standby state continues, the printer 100 shifts to an energy conservation mode in order to reduce power consumption.

Figure 5:
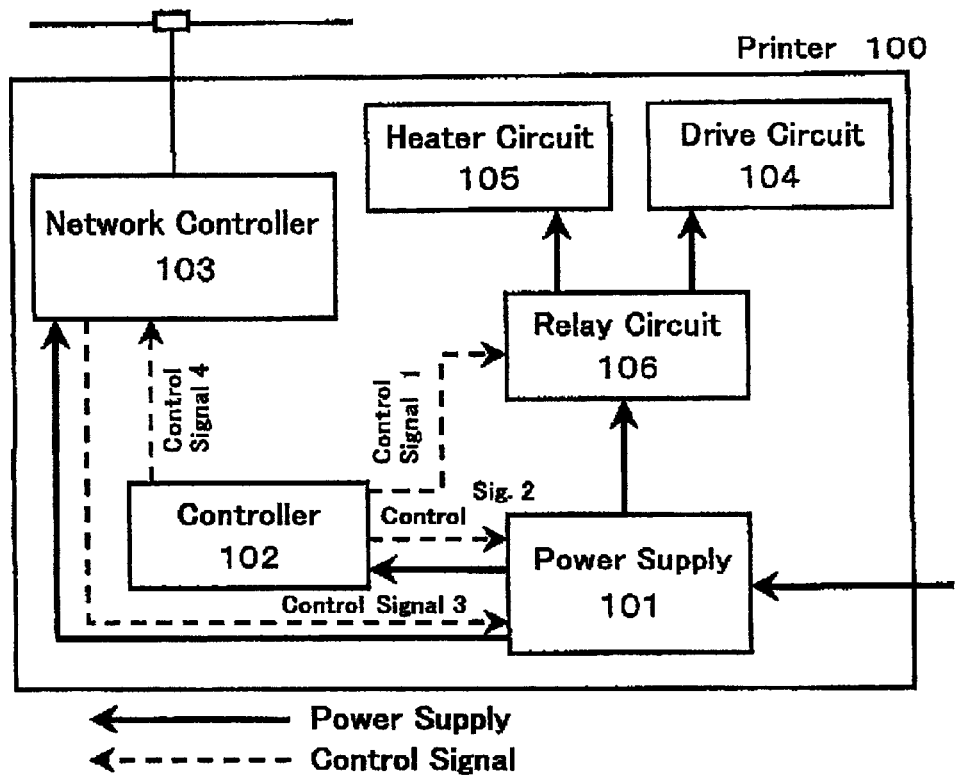
FIG. 5 is a functional block diagram showing the construction of the power supply system and the flow of control signals that control the power supply in the printer 100 shown in FIG. 1.

FIG. 5 is a functional block diagram showing the construction of the power supply system and the flow of the control signals that control the power supply in the printer 100 shown in FIG. 1.

The printer 100 shown in FIG. 5 includes a power supply unit 101 that supplies power to the entire printer 100, a controller 102 that performs overall control of the printer 100, a network controller 103 that includes the communication unit 11 shown in FIG. 2, a drive circuit 104 and a heater circuit 105 that are included in the image printer 16 or the like, and a relay circuit 106.

The power supply unit 101 provides control system power supply that supplies power to the controller 102, network control system power supply that supplies power to the network controller 103, and drive system power supply that supplies power to the drive circuit 104 and the heater circuit 105.

Based on this construction, a first energy conservation mode may be entered in which power is supplied to the network controller 103 but not to the drive circuit 104 or the heater circuit 105.

Figure 6:
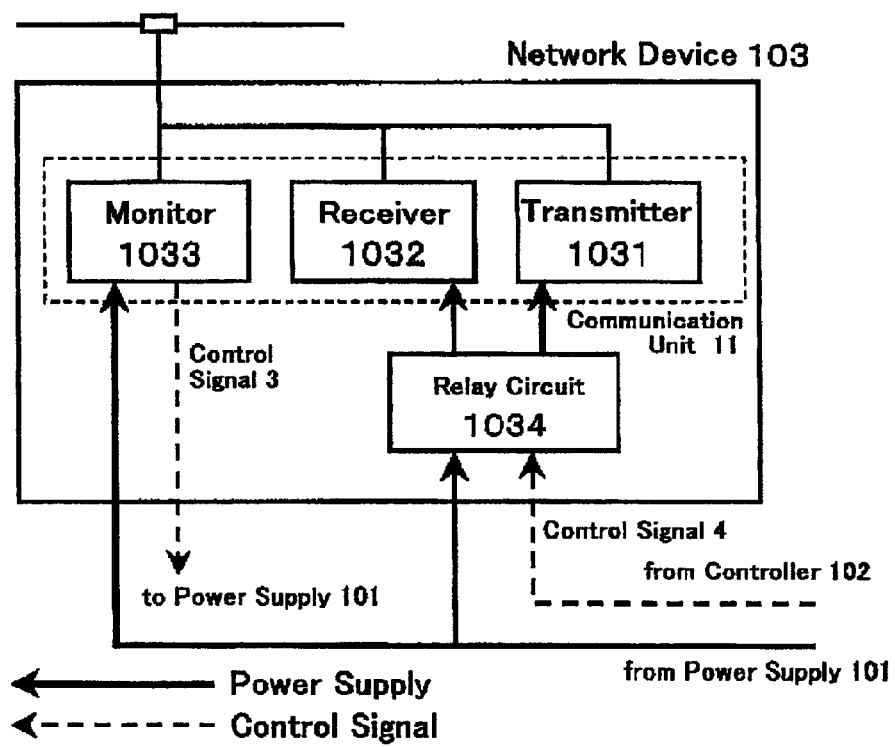
FIG. 6 is an illustration showing the construction of the network controller 103 shown in FIG. 5.

FIG. 6 is a block diagram showing the construction of the network controller 103 shown in FIG. 5.

The network controller 103 shown in FIG. 6 includes a transmitter 1031, a receiver 1032, a monitor 1033 and a relay circuit 1034.

The power supply unit 101 provides transmission/reception system power supply to the transmitter 1031 and the receiver 1032 through the network control system power supply provided to the network controller 103, as well as monitor power supply to the monitor 1033.

Based on this construction, a second energy conservation mode (sleep mode) may be entered in which power is supplied to the monitor 1033 but not to the transmitter 1031 or the receiver 1032.

Figure 7:
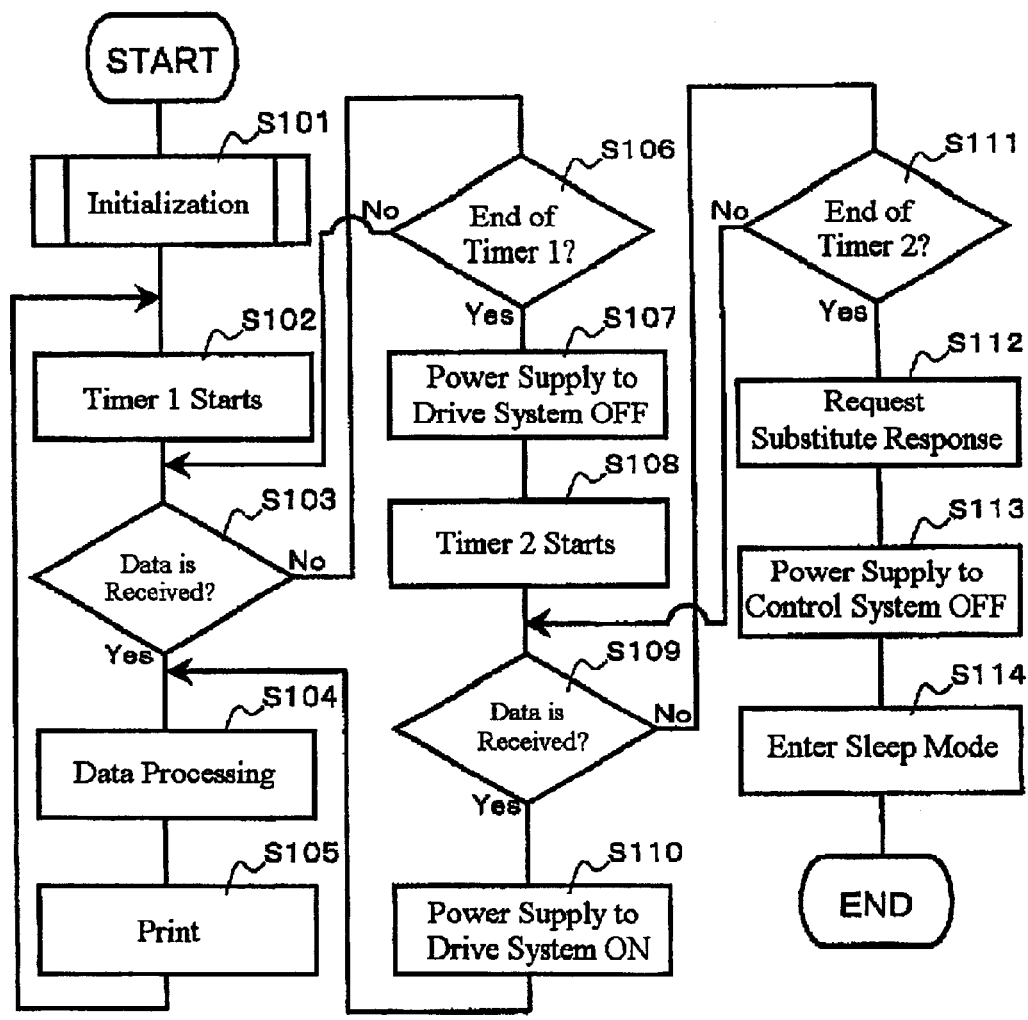
FIG. 7 is a flow chart showing the sequence of the power supply control routine performed by the controller 102 of the printer 100 of the above embodiment.

FIG. 7 is a flow chart showing the sequence of the power supply control routine performed by the controller 102 of the printer 100 of this embodiment.

With reference to FIG. 7, when the routine is begun, the controller 102 carries out initialization (S101). The initialization routine performed in step S101 is described below.

When initialization is completed in step S101, the controller 102 starts the time count by the timer 1 (S102).

The timer 1 that begins clocking in step S102 is a timer used for counting the time from the completion of initialization in step S101 to the shift of the printer 100 to the first energy conservation mode in step S107. The timer 1 is included in the controller 102.

When clocking by the timer 1 begins in step S102, the controller 1 monitors the receipt of data (S103).

The data received by the printer 100 in step S103 includes print data that is sent from the PC 300 or the network device 200 and based on which printing is performed, as well as status request data that requests printer 100 status information. Such data is received by the receiver 1032 of the network controller 103. In the receiver 1032, the data is received via an interrupt routine (YES in S103). The interrupt routine is described below.

The situation in which the data received by the receiver 1032 via an interrupt routine comprises status request data is described below.

Where the data received by the receiver 1032 via an interrupt routine comprises print data, processing is carried out by the image processor 14 of the printer 100 (S104).

The print data processing performed in step S104 is a routine in which the print data is converted into image information that will be actually printed.

The print data that was converted in step S104 into image information to be printed is subjected to the printing routine by the image printer 16 of the printer 100 (S105).

When the printing routine is completed in step S105, clocking by the timer 1 begins again in step S102. Each time the printer 100 receives print data over the network 400 and the printing routine, which is shown in the sequence from steps S103 through S105, is carried out, the timer 1 begins clocking. Therefore, if the above routine is repeated, the timer 1 repeatedly begins clocking, and clocking by the timer 1 does not end. Consequently, while the printer 100 is engaged in printing, it does not shift to the first energy conservation mode. The clocking by the timer 1 may be stopped when print data is received by the printer 100 in step S103.

Where it is determined in step S103 that the receiver 1032 of the printer 100 has not received print data (NO in S103), the controller 102 monitors the end of the clocking by the timer 1 (S106).

If it is determined in step S106 that the preset amount of time has elapsed without the receiver 1032 receiving print data, the timer 1 ends clocking (YES in S106). When this occurs, the printer 100 terminates power supply to the drive system (S107), and enters the first energy conservation mode.

In step S107, the controller 102 that has detected the end of clocking by the timer 1 sends a control signal 1 to the relay circuit 106. Based on the control signal 1, the drive system power supply that was provided from the power supply unit 101 to the drive circuit 104 and the heater circuit 105 via the relay circuit 106 is terminated. As a result, the printer 100 enters the first energy conservation mode.

In the first energy conservation mode, only the drive system power supply is terminated in the printer 100, but the control system power supply is still ON. Therefore, although printing becomes disabled in the image printer 16 of the printer 100, the controller 102 can still continue power supply control. The network controller 103 can also still continue to send or receive data.

When the drive system power supply is terminated and the printer 100 enters the first energy conservation mode in step S107, the controller 102 begins clocking using the timer 2 (S108).

The timer 2 that begins clocking in step S108 is a timer to count the time from when the printer 100 enters the first energy conservation mode until it shifts to the second energy conservation mode. The timer 2 is included in the controller 102.

When the timer 2 begins clocking in step S108, the controller 1 monitors the receipt of print data as in step S103 (S109).

Print data is received in step S109 via an interrupt routine as in step S103 (YES in S109).

When print data is received by the receiver 1032 in step S109, the drive system power supply, which was terminated in step S107, is resumed (S110).

When the controller 102 detects the receipt of print data in step S109, it sends a control signal 1 to the relay circuit 106. In step S110, based on the control signal 1 sent from the controller 102, the relay circuit 106 receives drive system power supply from the power supply unit 101.

When the relay circuit 106 receives drive system power supply from the power supply unit 101 in step S110, power is supplied to the drive circuit 104 and the heater circuit 105, whereby the printer 100 is released from the first energy conservation mode. Consequently, the printer 100 becomes available for printing again.

The print data received in step S109 undergoes processing for printing (S104), and printing is carried out (S105). The clocking by the timer 2 may be stopped when the print data is received by the printer 100 in step S109.

Where it is determined in step S109 that the receiver 1032 of the printer 100 has not received print data (NO in S109), the controller 102 monitors the completion of the clocking by the timer 2 (S111).

If it is determined in step S111 that the preset amount of time has elapsed with the receiver 1032 receiving no print data, the timer 2 ends clocking (YES in S111). When this occurs, the printer 100 sends a request to the network device 200 for a substitute response (S112).

When the printer 100 sends a request to the network device 200 for a substitute response in step S112, it sends information that comprises a response to the status request, ID information that identifies the printer 100 on the network 400 and a substitute response setting order.

The network device 200 that receives the request for a substitute response responds with the printer 100 status information on behalf of the printer 100 when the PC 300 requests status information from the printer 100. The substitute response routine performed by the network device 200 here is described below.

After requesting a substitute response of the network device 200 in step S112, the printer 100 terminates the power supply to the control system (S113). Consequently, the printer 100 enters the second energy conservation mode (sleep mode) (S114).

In step S113, the controller 102, which has detected the completion of clocking by the timer 2, sends a control signal 4 to the relay circuit 1034 of the network controller 103. Based on the control signal 4, the network control power supply that has been provided to the transmitter 1031 and the receiver 1032 from the power supply unit 101 via the relay circuit 1034 is terminated.

Furthermore, the controller 102 sends a control signal 2 to the power supply unit 101. Based on the control signal 2, the control power supply that has been provided to the controller 102 from the power supply unit 101 is terminated. Consequently, the printer 100 enters the second energy conservation mode (sleep mode) in step S114.

In the second energy conservation mode (sleep mode), power is supplied only to the monitor 1033, and not to any other components. Therefore, the printer 100 can no longer communicate with other devices connected to the network 400. Only the monitoring function of the monitor 1033 to monitor the data flowing in the network 400 is operating.

The printer 100, which has entered the second energy conservation mode (sleep mode) in step S114, ends the program and remains in the second energy conservation mode (sleep mode) until initialization is carried out in step S101 and the routine shown in FIG. 7 is begun again.

The printer 100, which has entered the second energy conservation mode in step S114, is released from the energy conservation mode when the main switch is pressed to terminate the main power supply, or when an order is received from the PC 300 to cancel the second energy conservation mode. The second energy conservation mode cancellation order is described in detail below.

Figure 8:
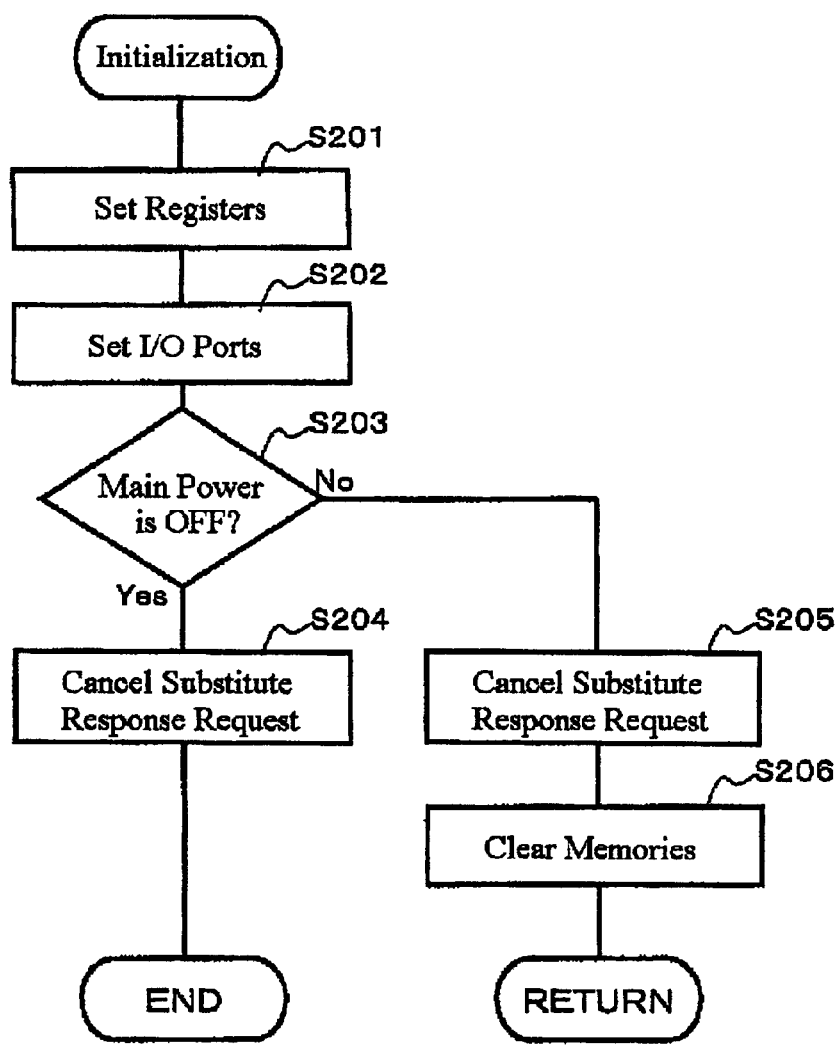
FIG. 8 is a flow chart showing the sequence of the initialization routine performed in step S101 in the flow chart shown in FIG. 7.

FIG. 8 shows the sequence of the initialization subroutine performed in step S101 of FIG. 7.

The initialization routine shown in the flow chart of FIG. 8 is carried out when any one of the following three situations exists. The first situation is where the main switch of the printer 100 is pressed to start the main power supply. The second situation is where the main power supply is terminated while the printer 100 is in the second energy conservation mode. The third situation is where the printer 100 is released from the second energy conservation mode.

In the above three situations, with reference to FIG. 8, setting of the internal registers and I/O ports that is necessary to begin the operation of the CPU 15 of the printer 100 takes place (S201, S202).

After the setting operation in steps S201 and S202, it is checked whether the main power of the printer 100 is terminated or is being supplied (S203).

Where the initialization routine shown in FIG. 8 is begun in the second situation described above, it is verified that the main power supply to the printer 100 has been terminated (YES in S203). In this case, the printer 100 sends the network device 200 a signal to instruct cancellation of the substitute response request (S204), and ends the program.

Where the initialization routine shown in FIG. 8 is begun in the first or third situation described above, it is verified that the main power to the printer 100 is being supplied (NO in S203). In this case, the printer 100 sends the network device 200 a signal to instruct cancellation of the substitute response request (S205). Furthermore, the printer 100 clears the internal memories thereof (S206).

Where the printer 100 is in the second energy conservation mode, the network device 200 from which a substitute response was requested in step S112 of FIG. 7 sends a substitute response containing the status information requested from the printer 100.

Where the main power supply to the printer 100 has been terminated, the printer 100's connection to the network 400 is also ended. When this occurs, if substitute status response setting has been in effect, the network device 200 continues to send a status response. Because a response is received from the network device 200, however, the PC 300 connected to the network 400 misunderstands that the printer 100 is connected to the network 400.

Because the printer 100 cancels the status response request in step S204, the PC 300 connected to the network 400 does not receive printer 100 status information from the network device 200. Consequently, the PC 300 connected to the network 400 can verify that the printer 100 is not connected to the network 400. In addition, the situation in which the printer 100 is mistakenly understood to be connected to the network 400 can be avoided.

In step S203, if the main power to the printer 100 is ON, the printer 100 enters the regular power consumption mode. The printer 100 sends the network device 200 a signal to instruct cancellation of the status response request in step S205, and the printer 100 itself carries out status response to a request for status information sent from other devices. Consequently, the PC 300 connected to the network 400 can verify that the printer 100 is available for printing.

The substitute response that is performed by the network device. 200 and that is cancelled in steps S204 and S205 is described below.

Initialization of the printer 100 is completed via the processes described above, and where it is determined in step S203 that power is being supplied to the printer 100, the CPU 15 returns to the flow chart in FIG. 7 showing the main routine. Where it is determined in step S203 that power is not being supplied to the printer 100, the program of the printer 100 comes to an end.

Figure 9:
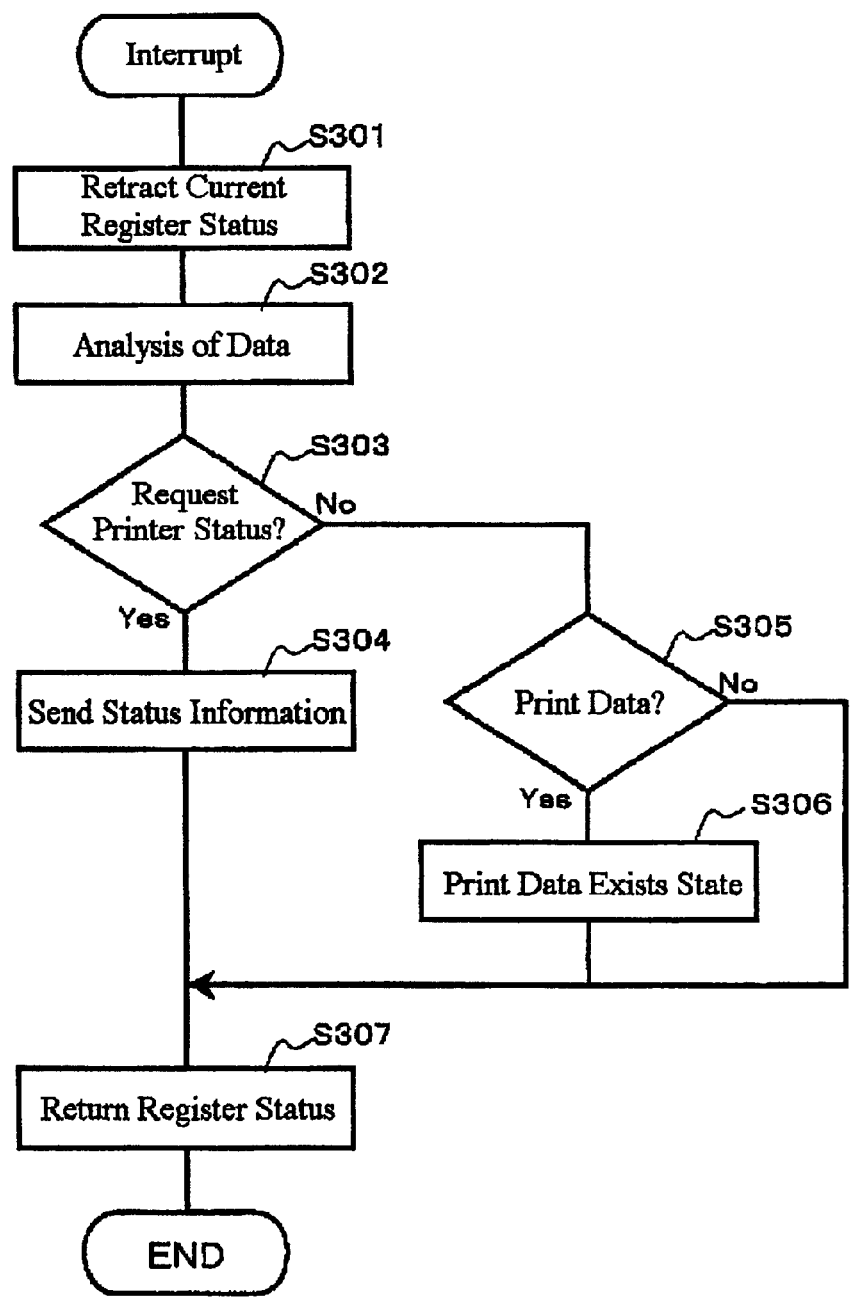
FIG. 9 is a flow chart showing the sequence of the interrupt routine performed in steps S103 and S109 of the flow chart shown in FIG. 7.

FIG. 9 is an interrupt subroutine carried out by the printer 100 in step S103 of FIG. 7 when data is received.

With reference to FIG. 9, when the network controller 103 receives data, the printer 100 retracts the current register status to a different region of the memory (S301). In addition, the monitor 1033 performs analysis of the received data (S302).

Where it is determined as a result of the analysis in step S302 that the received data is a request for the printer 100 status information (YES in S303), the printer 100 sends a status information response via the transmitter 1031 (S304).

Where it is determined as a result of the analysis in step S302 that the received data is not a request for the printer 100 status information (NO in S303) but print data (YES in S305), the printer 100 is set to a 'print data exists' mode (S306).

When the printer 100 is set to the 'print data exists' mode in step S306, the controller 102 determines in steps S103 and S109 of the flow chart shown in FIG. 7 that the controller 102 has received print data.

After the printer 100 is set to the 'print data exists' mode in step S306, the printer 100 returns the register status that was retracted to a different region of the memory in step S301 to the state existing prior to the interrupt (S307), and ends the interrupt routine.

Reduction in power consumption via the routine shown in FIG. 7 performed by the printer 100 is realized because the printer 100 has two control system power supply lines, i.e., the power supply to the controller 102 and the power supply to the network controller 103. When the first energy consumption mode is activated, the printer 100 terminates the power supply to the drive system, and further, when the second energy conservation mode (sleep mode) is activated, it terminates that part of the power supplied to the control system that is supplied to the controller 102. Consequently, the printer 100 enters an energy conservation state in which power is supplied to the network controller 103, but the level of operation is minimized in order to reduce power consumption.

Even where the printer 100 is in the second energy conservation mode (sleep mode), other devices connected to the network 400 request status information from the printer 100 when printing is to be performed. However, because the printer 100 is operating only with the function of monitoring the data flowing in the network 400, it cannot respond with status information. Where status information is not obtained from the printer 100, other devices such as the PC 300 that request status information cannot verify that the printer 100 is connected to the network 400. Therefore, they cannot initiate printing. The printer 100 therefore requests in step S112 that the network device 200 respond with the status information on its behalf.

Figure 10:
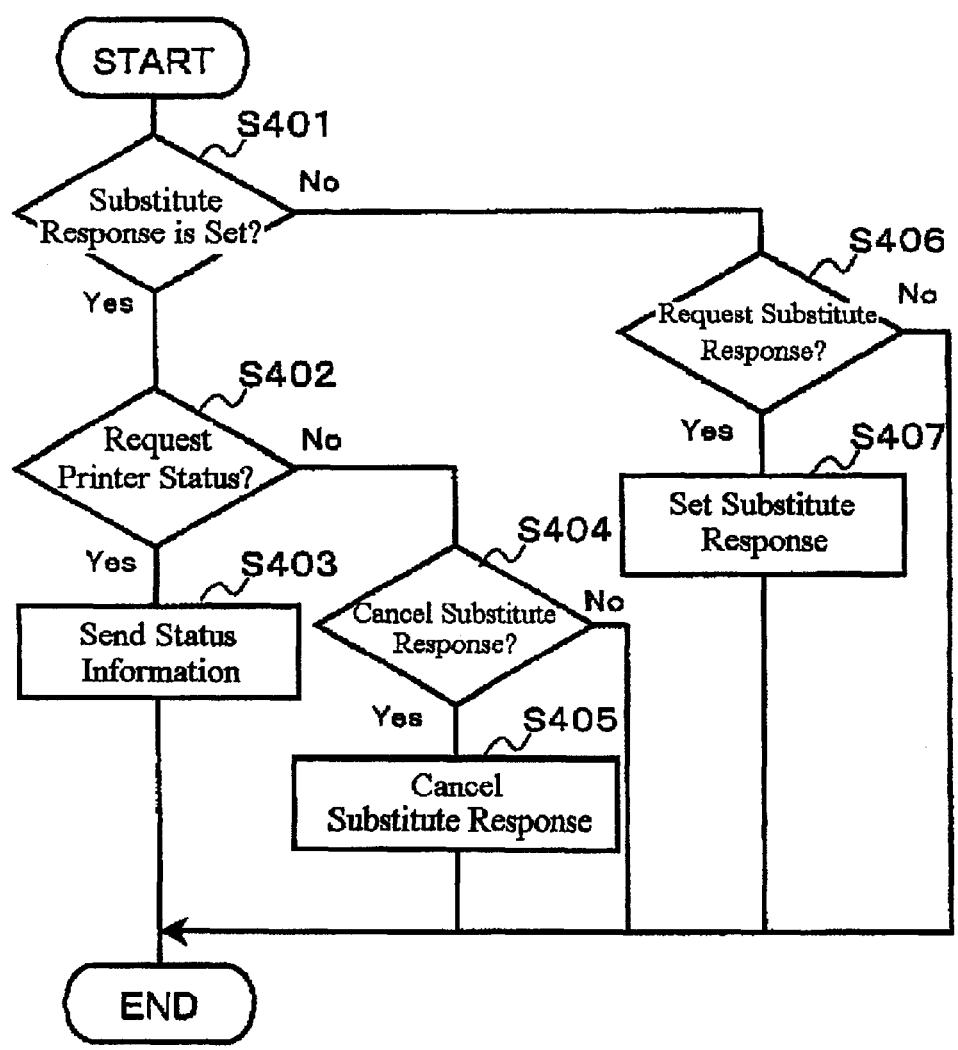
FIG. 10 is a flow chart showing the processing performed by the network device 200 from which a substitute response containing the printer status information is requested.

FIG. 10 is a flow chart showing the sequence of the routine carried out by the network device 200 from which a substitute response containing status information is requested.

With reference to FIG. 10, the network device 200 determines whether or not substitute response setting is in effect (S401). Where substitute response setting is in effect (YES in S401), the CPU 201 monitors via the LAN or modem card 203 for a printer 100 status information request in the network 400 (S402).

When a printer 100 status information request is found in the network 400 in step S402 (YES in S402), the network device 200 sends on behalf of the printer 100 a status response to the device that requested the status information (S403).

The printer 100 status information sent by the network device 200 on behalf of the printer 100 in step S403 includes ID information such as the network address of the printer 100 and the information that the printer 100 is in the second energy conservation mode (sleep mode).

Where there is no printer 100 status information request in the network 400 (NO in S402), the network device 200 verifies whether or not a signal that instructs the cancellation of substitute response has been transmitted from the printer 100 (S404).

If a signal to instruct cancellation of substitute response has been received from the printer 100 (YES in S404), the network device 200 cancels the substitution response setting (S405).

Where it is determined in step S401 that substitute response setting is not in effect (NO in S401), the network device 200 verifies whether or not a substitute response request has been issued from the printer 100 (S406).

Where it is determined in step S406 that a substitute response request has been issued from the printer 100 (YES in S406), the network device 200 puts substitute response setting into effect (S407).

Where it is determined in step S406 that the printer 100 has not issued a substitute response request (NO in S406), the network device 200 ends the substitute response routine.

The program for the substitute response routine described above and shown in FIG. 10 may be carried out periodically or as needed by the network device 200.

Figure 11:
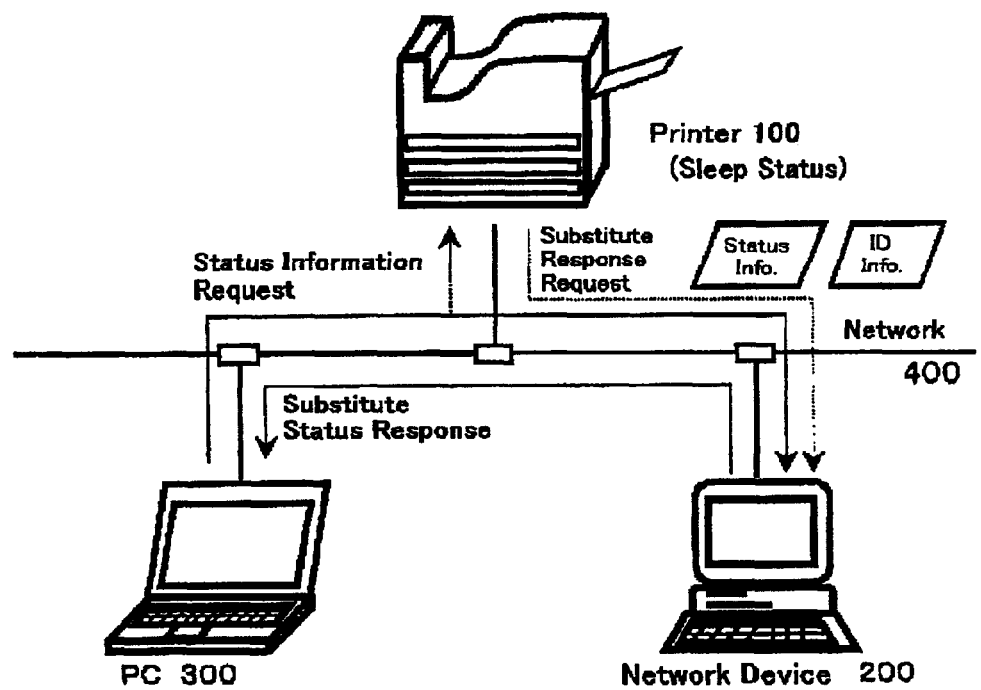
FIG. 11 is an illustration showing the network system when the printer 100 is in the second energy conservation mode.

FIG. 11 is an illustration showing the network system in which the printer 100 is in the second energy conservation mode.

The printer 100 sets the network device 200 such that it will provide a substitute response to a status information request addressed to the printer 100 before the printer 100 enters the second energy conservation mode, as shown in FIG. 7. With reference to FIG. 11, when the PC 300 requests status information from the printer 100, the network device 200 that detected the request returns a predetermined status response indicating that the printer 100 is in the second energy conservation mode. Therefore, the PC 300 can obtain the printer 100 status information as if the printer 100 had returned the status response.

When the printer 100 is in the second energy conservation mode, the PC 300 can learn the state of the printer 100 from the status information that was sent from the network device 200 on behalf of the printer 100. When performing printing while the printer 100 is in the second energy conservation mode, the PC 300 can boot the printer 100 by sending a special packet (hereinafter referred to as a 'magic packet') to the printer 100.

Figure 12:
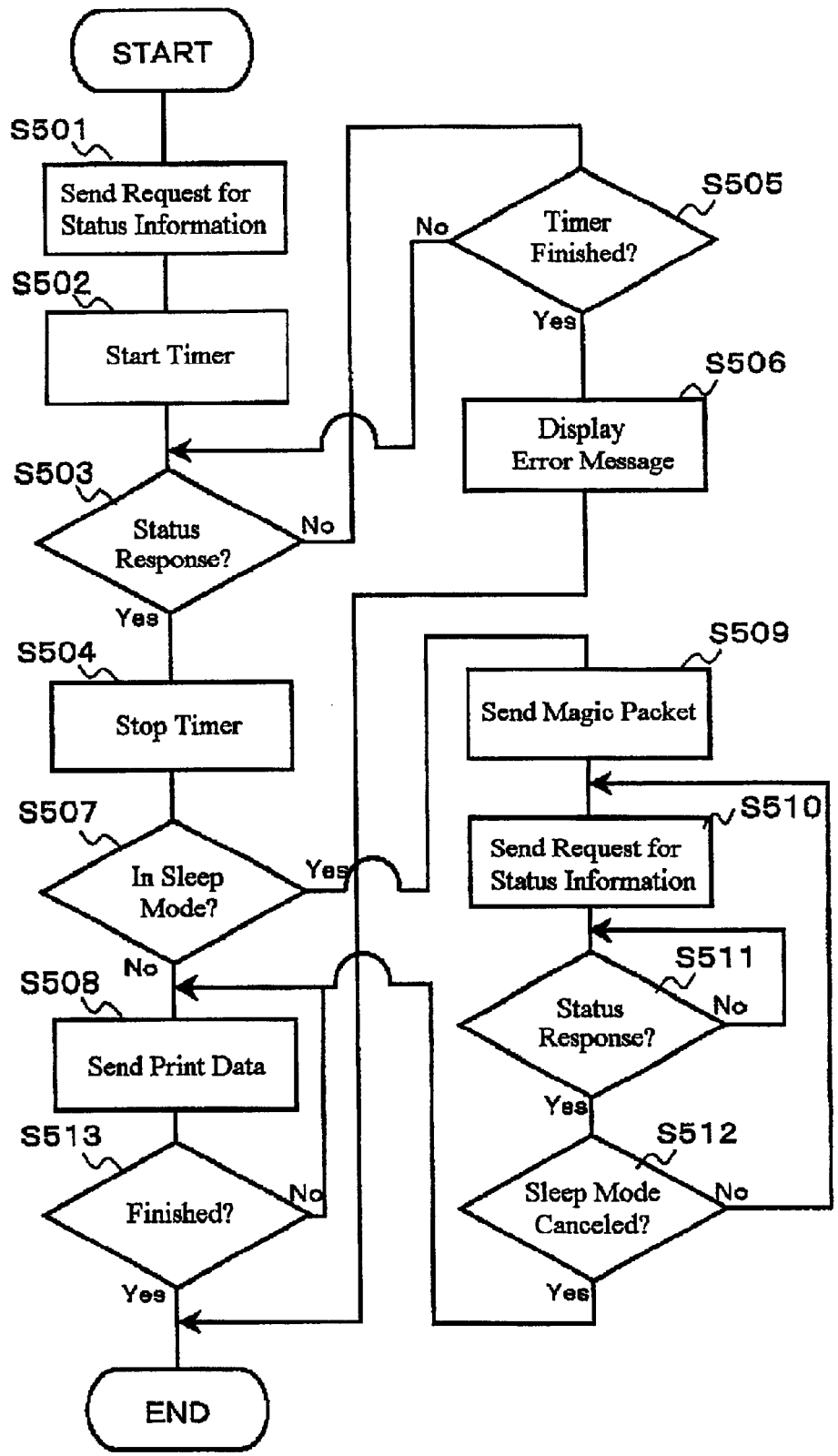
FIG. 12 is a flow chart showing the sequence of the printing routine performed by the PC 300 via the printer 100.

FIG. 12 is a flow chart showing the sequence of the printing routine performed by the PC 300 via the printer 100.

With reference to FIG. 12, when performing printing via the printer 100, the PC 300 sends the printer 100 a request for status information (S501).

When the request is sent in step S510, the PC 300 begins the clocking of an internal timer (S502).

The timer that begins clocking in step S502 is a timer to count the interval that elapses between the time at which the PC 300 sends the printer 100 a status request and the time at which a status response is received.

Where a printer 100 status response is received by the PC 300 within a preset amount of time (YES in S503), the PC 300 stops the clocking by the timer (S504).

The PC 300 can decode the status response received in step S503 to verify the state of operation of the printer 100. In doing so, it determines whether or not the printer 100 is in the second energy conservation mode (sleep mode) (S507).

Where a response containing the printer 100 status information is not received within the preset amount of time (NO in S503 and YES in S505), the PC 300 causes the display unit 302 to display an error message (S506).

The error message displayed on the display unit 302 in step S506 comprises a text message indicating that the printer 100 is not connected to the network 400 or that there is a failure in the connection.

Because the printer 100 cannot receive print data from the PC 300 in this case, the PC 300 ends the program.

Where it is verified in step S507 that the printer 100 is not in the second energy conservation mode (sleep mode)(NO in S507), the PC 300 sends print data to the printer 100 (S508), enabling the printer 100 to carry out printing (S513). If the printer 100 is not in the second energy conservation mode (sleep mode), a status response is sent from the printer 100.

Where it is verified in step S507 that the printer 100 is in the second energy conservation mode (sleep mode)(YES in S507), the PC 300 sends a magic packet to the printer 100 in order to release the printer 100 from the energy conservation mode (S509). If the printer 100 is in the second conservation mode (sleep mode), a status response is sent from the network device 200 in which substitute response setting has been put in effect.

The magic packet sent in step S509 comprises, of the data transmitted via the network and having a certain format, data having a specific data array. The monitor 1033 of the printer 100 can detect the specific data array of the magic packet only if the second energy conservation mode is ON.

When the printer 100 is in the second energy conservation mode and the monitor 1033 of the printer 100 that is monitoring the data flowing in the network 400 detects that a magic packet, which is sent in step S509, is in existence in the network 400, it sends a control signal 3 to the power supply unit 101. Based on the control signal 3, power supply is resumed from the power supply unit 101 to the various components of the printer 100. Consequently, the printer 100 is released from the energy conservation mode. When this occurs, in the printer 100, the power supply control routine shown in FIG. 7 is begun and the initialization routine shown in FIG. 8 takes place. In step S205 of FIG. 8, the substitute response setting is nullified in the network device 200, and the printer 100 returns to the standby mode in which it awaits the receipt of print data.

After sending a magic packet in step S509, the PC 300 once again sends a status information request to the printer 100 (S510).

The status information request in step S510 is sent in order to verify whether or not the printer 100 was released from the energy conservation mode via the magic packet sent by the PC 300 in step S509.

Where a status response was sent from the printer 100 in response to the status request sent in step S510 (YES in S511), the PC 300 decodes the status response, as in step S507, and verifies the state of operation of the printer 100 (S512).

Where a status request is sent to the printer 100 in step S510, the PC 300 may count the time until a status response is received using a timer, as in step S502. Where a status response is not obtained within a preset amount of time, the PC 300 may cause an error message to be displayed on the display unit 302 and end the routine.

Where it is verified in step S512 that the printer 100 has not been released from the second energy conservation mode (sleep mode)(NO in S512), the PC 300 sends a status request to the printer 100 once more (S510).

When it is verified from the status response that the printer 100 has not been released from the sleep mode, the PC 300 may send a magic packet once more. Alternatively, it may send a preset number of status requests or magic packets, or it may, when the PC 300 counts the time via the timer, and if the printer 100 is not released from the second energy conservation mode (sleep mode) within a preset amount of time, cause an error message to be displayed and end the routine.

Where it is verified in step S512 that the printer 100 has been released from the sleep mode (YES in S512), the PC 300 sends the printer 100 print data (S508), based on which printing may be performed via the image printer 16 of the printer 100 (S513).

Figure 13:
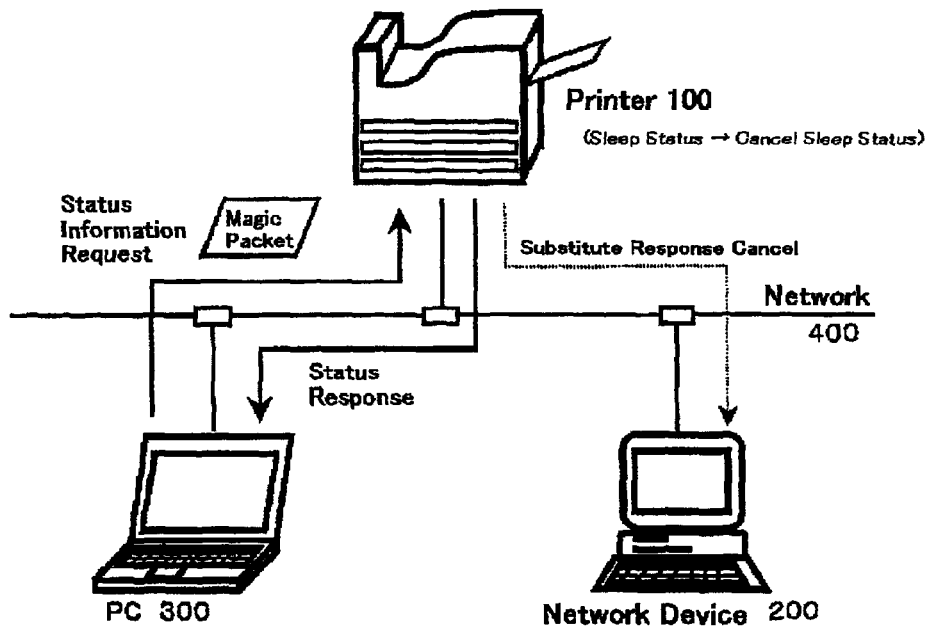
FIG. 13 is an illustration showing the network system when the printer 100 is released from the second energy conservation mode.
Figure 14:
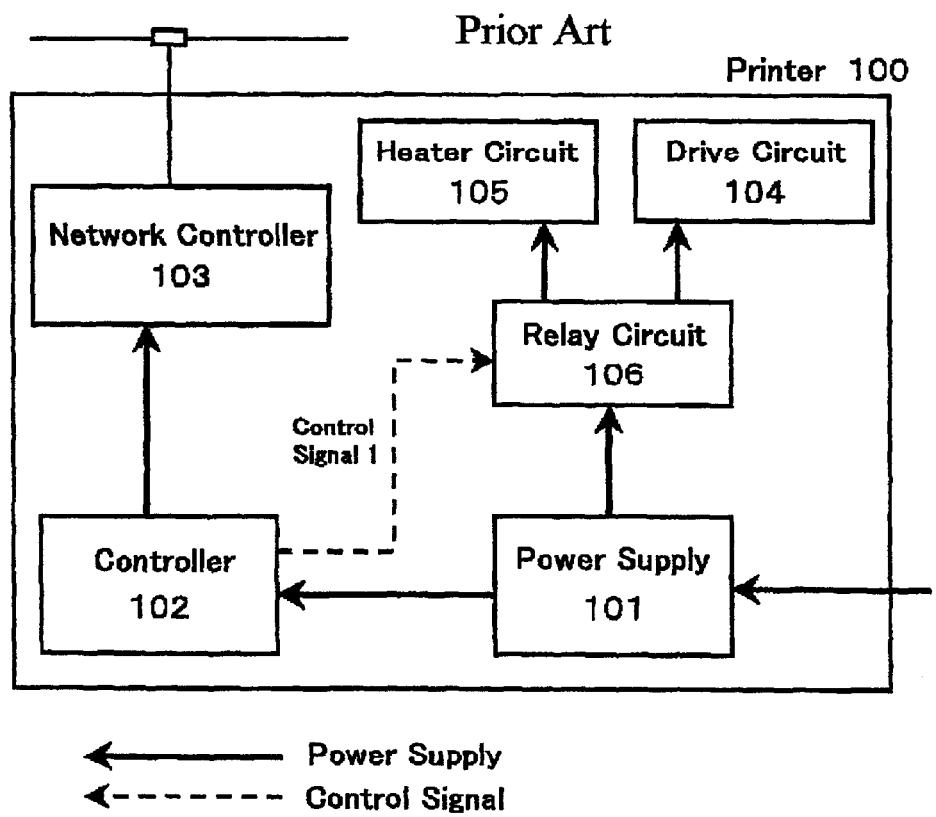
FIG. 14 is a block diagram showing the construction of the power supply system of the printer 100 in the conventional art.

FIG. 13 is an illustration showing the network system when the printer 100 is released from the second energy conservation mode.

With reference to FIG. 13, when performing printing via the printer 100, which is in the second energy conservation mode, the PC 300 sends a magic packet as described above. The printer 100 that detects the magic packet thus sent cancels the second energy conservation mode. It further cancels the substitute response setting in the network device 200. The printer 100 also sends a status response in response to the status information request sent from the PC 300. The PC 300 verifies from the printer 100 status response that the printer 100 is released from the energy conservation mode. The PC 300 then sends print data to the printer 100, whereby the printer 100 carries out printing.

Through the processing described above, even if the printer 100 is in the energy conservation mode, the PC 300 can release the printer 100 from the energy conservation mode and carry out printing.

Because a device other than the printer 100, i.e., the network device 200, performs substitute response described above, the power supply to the communication system may be terminated in the printer 100.

In addition, when a magic packet is sent by the PC 300 before the printing routine is executed, the printer 100 may be released from the energy conservation mode. Consequently, the printer 100 only needs power supply to the monitor 1033 that can detect the magic packet when the energy conservation mode is activated.

Through this operation, the power consumption of the printer 100 may be further reduced.

Through this operation, further reduction in power consumption as well as user convenience can be ensured.

The shift of the printer 100 to the sleep mode, which is shown in FIG. 7, the substitute response performed by the network device 200, which is shown in FIG. 10, and the release of the printer 100 from the sleep mode, which is shown in FIG. 12 and carried out by the PC 300, may be provided in the form of a program. Such a program is a computer-readable program. It may be provided as a program product recorded in such a recording medium as a floppy disk, CD-ROM, ROM, RAM or memory card that may be used in conjunction with the computer, or in the computer's built-in hard disk. It can also be provided via downloading from the network. The provided program product is installed on the hard disk and read by the RAM for execution. A program product includes the program itself and the recording medium in which the program is recorded.

The sending of a substitute response containing the printer 100 status information may be performed by the PC 300. In that case, the PC 300 receives the substitute response that it sent on behalf of the printer 100 via the network 400, and verifies the sleep mode of the printer 100.

The embodiment disclosed above is in all aspects an example and should not be construed as restrictive in any way. The scope of the present invention is indicated by the claims, not by the descriptions provided above, and includes all changes and modifications within the meaning and scope equivalent to the claims.

What is claimed is:

1. A printer comprising:
    a receiver that receives data from a first device over a network;
    a controller that alternates a state of the printer between a first state in which the printer is able to respond to data received by the receiver and a second state in which the printer is not able to respond to the data, and that outputs a substitute response request signal to a second device over the network so that the second device may respond to the data, which is sent from the first device to the printer when the printer is in the second state.

2. The printer according to claim 1,
    wherein the receiver receives the data that includes a request for information regarding the status of the printer.

3. The printer according to claim 2,
    wherein the controller outputs the substitute response request signal that includes printer identification information and status information.

4. The printer according to claim 1,
    wherein the controller switches the state of the printer from the second state to the first state in accordance with the data that includes a control signal received by the receiver from the first device.

5. The printer according to claim 4,
    wherein the controller outputs, to the second device, in which a substitute response is set, via the substitute request signal that orders a substitute response to a status request sent from the first device, a release request signal that cancels the substitute response, when a state of the printer is switched from the second state to the first state by the controller.

6. The printer according to claim 1,
    further comprising a power supply unit that supplies power to the controller, and when main power supply to the power supply unit is terminated while the printer is in the second state, before the main power supply is terminated, the controller outputs a release request signal that cancels the substitute response to the second device in which substitution is set based on the substitute request signal sent over the network.

7. A data processing apparatus comprising:
    a monitor that monitors a request for status information, which request is sent from an external device to a printer;
    a receiver that receives data from the printer over a network, wherein the data includes a substitute response request signal printer identification information and printer status information, wherein the substitute response request signal orders a substitute response be sent to the external device in response to the request for status information; and
    a controller that sends to the external device a response containing status information instead of the printer according to the request for status information after the receiver receives the substitute response request signal.

8. The data processor according to claim 7,
    wherein when a release request signal that cancels the substitute response is received by the receiver from the printer, the controller cancels the setting that enables the substitute response to the external device.

9. The data processing apparatus according to claim 7,
    wherein if the controller, based on status information received from the printer over a network, determines that the printer is in a state in which the printer is not able respond, the controller outputs to the printer a release request signal that cancels the state and enables the printer to respond.

10. A printing system comprising a printer and a data processing apparatus,
    the printer including a receiver that receives a request for status information from an external device over a network; a controller that switches a state of the printer between a first state in which the printer is able to respond to the request for status information received by the receiver and a second state in which the printer is not able to respond to the request for status information, and that outputs a substitute response request signal to the data processing apparatus over the network so that the data processing apparatus may respond to the request for status information, which is sent to the printer from the external device when the printer is in the second state; and
    the data processing apparatus including a monitor that monitors the request for status information, which is sent from the external device to the printer; a receiver that receives data from the printer over the network, wherein the data includes the substitute response request signal, printer identification information and printer status information; and a controller that sends to the external device a substitute response containing the printer status information instead of the printer according to the request for status information, after the receiver of the data processing apparatus receives the substitute response request signal.

11. A printer control method comprising:
    switching a state of the printer between a first state in which the printer is able to respond to data received from an external device over a network and a second state in which the printer is not able to respond to the data from the external device; and
    outputting a substitute response request signal to a data processing apparatus over the network so that the data processing apparatus may respond to the data, which is sent from the external device to the printer, when the state of the printer is in the second state.

12. A data processing method of a data processing apparatus, comprising:
    receiving data, from a printer over a network, the data includes a substitute response request signal that orders a substitute response be sent to a device in response to a request for status information that was sent to the printer by the device, the data also includes printer identification information and printer status information;
    monitoring the request for status information, which is sent from the device to the printer; and sending a substitute response to the device in response to monitoring the request for status information after receiving the substitute response request signal, wherein the substitute response contains the status information.

13. A printing system comprising a printer, data processing apparatus and an external device, the printer including a receiver that receives data from an external device over a network; a controller that switches a state of the printer between a first state in which the printer is able to respond to a request for status information received by the receiver and a second state in which the printer is not able to respond to the request for status information, and that outputs a substitute response request signal to the data processing apparatus over the network so that the data processing apparatus may respond to the request for status information, which is sent from the external device to the printer, when the printer is in the second state;

the data processing apparatus including a monitor that monitors the request for status information, which is sent from the external device to the printer; a receiver that receives data from the printer over the network, wherein the data includes a substitute response request signal, printer identification information and printer status information; and a controller that sends to the external device a substitute response containing the printer status information instead of the printer according to the request for status information, after the receiver of the data processing apparatus receives the substitute response request signal; and the external device including a controller that sends to the printer a packet for changing the state of the printer to the first state from the second state when the external device receives the substitute response from the data processing apparatus.

14. A software program for a computer of a printer to execute the following steps:

receiving data from a first device over a network;

switching a state of the printer between a first state in which the printer is able to respond to data received from the first device and a second state in which the printer is not able to respond to the data; and outputting a substitute response request signal to a second device over the network so that the second device may respond to the data, which is sent from the first device to the printer when the state of the printer is in the second state.

15. The software program according to claim 14, wherein the data from the first device includes a printer status request.

16. The software program according to claim 15, wherein the substitute response request signal includes a printer identification information and a status information of the printer.

17. The software program according to claim 14, wherein the state of the printer is switched from the second state to the first state in accordance with the data that includes a control signal and that is received from the first.

18. The software program according to claim 17, wherein when the state of the printer is switched from the second state to the first state, a release request signal is output to the second device to which the substitute response request signal is sent.

19. The software program according to claim 14, wherein when power supply is terminated while the printer is in the second state, before the power supply is ordered to be terminated, a release request signal that cancels the substitute response to the data is output to the second device over the network.

20. A recording medium on which the printing software program according to claim 14 is recorded.

21. A data processing software program to cause a computer to execute the following steps:

receiving from a printer over a network, data that includes a substitute response request signal that orders the computer to make a substitute response to a request for status information of the printer, printer identification information and printer status information;

monitoring the request for status information, which is sent from a device to the printer; and sending a printer status to the device, when the request for status information is monitored after receiving the substitute response request signal.

22. The data processing software program according to claim 21, wherein when a release request signal that cancels the substitute response is received from the printer, the substitute response is cancelled.

23. A recording medium on which the data processing software program according to claim 21 is recorded.

* * * * *